US007808185B2

(12) United States Patent
Ng et al.

(10) Patent No.: US 7,808,185 B2
(45) Date of Patent: Oct. 5, 2010

(54) BACKLIGHT CURRENT CONTROL IN PORTABLE ELECTRONIC DEVICES

(75) Inventors: Richard Ng, Palatine, IL (US); Daniel B. Cox, Palatine, IL (US); Joseph L. Allore, Mundelein, IL (US)

(73) Assignee: Motorola, Inc., Schaumburg, IL (US)

( * ) Notice: Subject to any disclaimer, the term of this patent is extended or adjusted under 35 U.S.C. 154(b) by 1124 days.

(21) Appl. No.: 10/974,864

(22) Filed: Oct. 27, 2004

(65) Prior Publication Data

US 2006/0087245 A1 Apr. 27, 2006

(51) Int. Cl.
*H05B 37/026* (2006.01)

(52) U.S. Cl. ....................... 315/157; 315/158; 315/159; 345/102

(58) Field of Classification Search ................. 315/157, 315/158, 159, 149, 150; 345/102
See application file for complete search history.

(56) References Cited

U.S. PATENT DOCUMENTS 4,029,991 A * 6/1977 Schultz ....................... 315/135
5,384,577 A 1/1995 McLaughlin et al.
5,554,912 A * 9/1996 Thayer et al. ............... 315/157
6,563,479 B2 5/2003 Weindorf et al.
6,798,395 B1 * 9/2004 Yamauchi et al. ........... 345/102
2005/0093466 A1 * 5/2005 Matsumoto ............. 315/169.3

FOREIGN PATENT DOCUMENTS

EP 0 381 684 B1 12/1994

* cited by examiner

*Primary Examiner*—David Hung Vu
(74) *Attorney, Agent, or Firm*—Gary J. Cunningham

(57) ABSTRACT

A method in a portable electronic device (100) having a user interface illumination (110) is disclosed. The method comprises sensing (202) an ambient light level in a neighborhood of the portable electronic device with a sensor (104) of the portable electronic device. Based on the ambient light level sensed, then controlling (204) a visual characteristic of the user interface illumination, wherein the user interface illumination is operated at a brightness between a maximum brightness and a minimum brightness for at least one ambient light level detected.

10 Claims, 5 Drawing Sheets

122
TRANSCEIVER 120
POWER SOURCE 124
104
LIGHT SENSOR
106
A/D CONVERTER
102
MICRO CONTROLLER
FLIP SWITCH
115
DISPLAY 118
KEYPAD 116
110
DISPLAY BACKLIGHT ILLUMINATION 112
KEYPAD BACKLIGHT ILLUMINATION 114
108
PROGRAMMABLE CURRENT SINK
101

BACKLIGHT CURRENT CONTROL IN PORTABLE ELECTRONIC DEVICES

FIELD OF THE DISCLOSURE

The present disclosure relates generally to portable electronic device, and more particularly to user interface illumination control and power management.

BACKGROUND OF THE DISCLOSURE

It is known generally to reduce backlighting in laptop computers when the computer operates on battery power. It is also known to enable and disable a keypad backlight in a wireless communication device based on an ambient light sensor output.

Illumination of the user interface of the device allows the user operate the device under adverse lighting conditions. A display or keypad, for example, may require illumination under low ambient light conditions such as in a dark room. The display illumination is turned on under the low ambient light condition based on the ambient light sensor output. However, some displays require illumination under various lighting conditions such as under high ambient light conditions where the display may be washed out. Additionally, having the illumination set at maximum brightness burdens the device with unnecessary current drain.

Illumination is not necessary under all lighting conditions and it is therefore generally known to enable or disable the illumination as needed with the use of an on/off toggle switch, light sensor or a timer. However, with these methods, the battery is drained unnecessarily when the illumination is turned on when not needed.

The various aspects, features and advantages of the disclosure will become more fully apparent to those having ordinary skill in the art upon careful consideration of the following Detailed Description thereof with the accompanying drawings described below.

DETAILED DESCRIPTION OF THE DRAWINGS

A method and apparatus for controlling user interface illumination in a wireless communication device is disclosed. The method comprises detecting an ambient light level in a neighborhood of the portable electronic device with a sensor of the portable electronic device. Then controlling brightness of the user interface illumination based on the ambient light level detected, wherein the user interface illumination is operated at a brightness between a maximum brightness and a minimum brightness for at least one ambient light level detected. Other characteristics of the display may be controlled as a function of the ambient light level such as the contrast level of the display for example.

Figure 1:
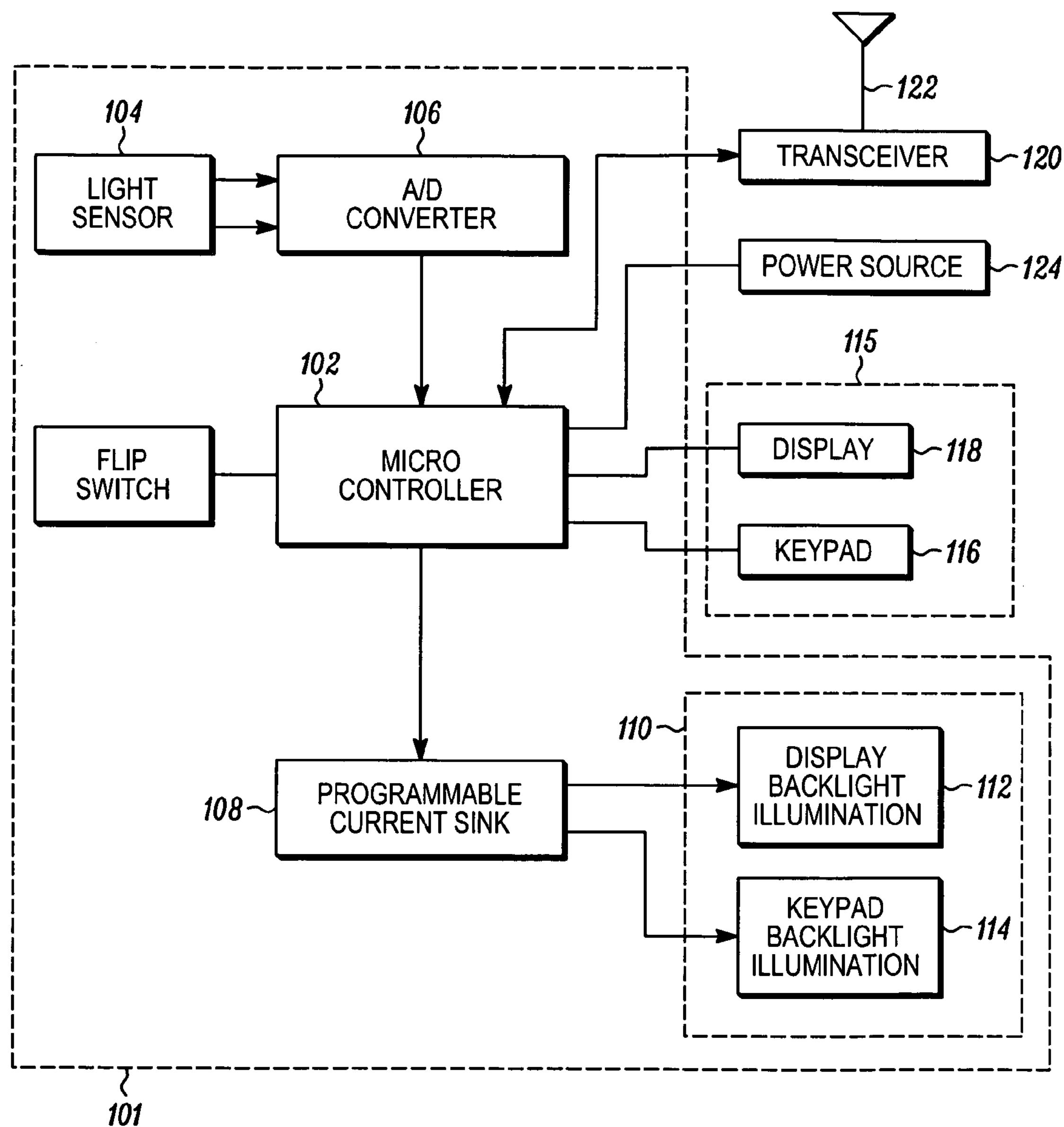
FIG. 1. is an exemplary block diagram of an illumination current control circuit.

FIG. 1 illustrates an exemplary electronic device 100 having an illumination current control circuit 101. The illumination current control circuit 101 includes a controller 102, a light sensor 104, an analog to digital converter (ADC) 106, a programmable current sink 108 and a backlight illumination source 110. The illumination source 110 includes a display backlight 112 and a keypad backlight 114. The device 100 also includes a user interface 115 which includes a keypad 116 and a display 118 in this exemplary embodiment. The electronics device 100 is a radiotelephone in this exemplary embodiment. The radiotelephone 100 described herein is a representation of the type of wireless communication device that may benefit from the present invention. However, it is to be understood that the present invention may be applied to any type of hand-held or portable electronic device including, but not limited to, the following devices: radiotelephones, cordless phones, paging devices, personal digital assistants, portable computers, pen-based or keyboard-based handheld devices, remote control units, portable media players such as an audio player (such as an MP3 player) and the like. Accordingly, any reference herein to the radiotelephone 100 should also be considered to apply equally to other hand-held or portable electronic devices. The electronic device 100 may have a power source 124 which may be a battery or external source of power such a transformed coupled to a wall outlet.

The light sensor 104 may be a photo diode, such as a silicon photo diode or photo transistor for example. The ambient light may also be sensed by a camera carried on the device. The light sensor in the camera used to adjust camera settings may be used to sense the ambient light to provide input to the microprocessor and the current sink to control the user interface illumination 110. The light sensor 104 may be made up of multiple photo diodes placed together or at multiple locations. For example, one light sensor on the top of the device and one light sensor on the bottom of the device. The light sensor 104 may also include a current amp coupled to the photo diode, amplifying the current before the signal is input to the ADC 106.

The electronic device 100 in the exemplary embodiment also includes optional circuitry to carry out wireless communications. The device 100 includes a transceiver 120 and an antenna 122 for transmission and reception of communication signals in accordance with the protocol or protocols in which the radiotelephone 100 is designed to operate under. For example the radiotelephone 100 may be designed to operate under the following protocols alone or in any combination thereof but is not limited to, Code Division Multiple Access (CDMA), CDMA2000, Global System for Mobile communication (GSM), Universal mobile telephone system (UMTS), wideband (WCDMA), wireless local area network (WLAN) such as 802.11 (WiFi), WiMAX (802.16) systems and the like.

The light sensor 104 of the exemplary device 100 is coupled to an analog to digital converter (ADC) 106. The ADC 106 may be stand alone circuitry of the device 100 or the ADC 106 may be incorporated into or a portion of the microcontroller 102 or the programmable current sink 108. Analog signals output from the light sensor 104 are converted by the ADC to digital signals that represent the amount of ambient light sensed by the light sensor 104. The microcontroller 106 receives the digital signals generated by the ADC 106 to determine the illumination setting for the user interface 115, which in this exemplary embodiment is the keypad 116 or the display 118, or the combination thereof. The microcontroller 102 is coupled to the programmable current sink 108 wherein the microcontroller 102, or a code segment or algorithm therein, after determining the illumination setting, sends an appropriate signal to the programmable current sink 108 which delivers the desired current to the illumination source of the user interface 115.

In this exemplary embodiment, the illumination source 110 includes a display backlight 112 and a keypad backlight 114. The keypad backlight 114 illuminates the keypad 116 and the display backlight 112 illuminates the display 118. The display backlight 112 and the keypad backlight 114 may be an incandescent lamp, an LED (or a plurality of LED's) or an electroluminescent panel for example. The illumination does not have to be a backlighting configuration, for example the illumination may be configured from the front or side lighting angles for example. It is to be understood by one of ordinary skill in the art that there are numerous illumination sources and techniques that may be incorporated into the present invention. For example, indirect illumination may also be used.

Figure 2:
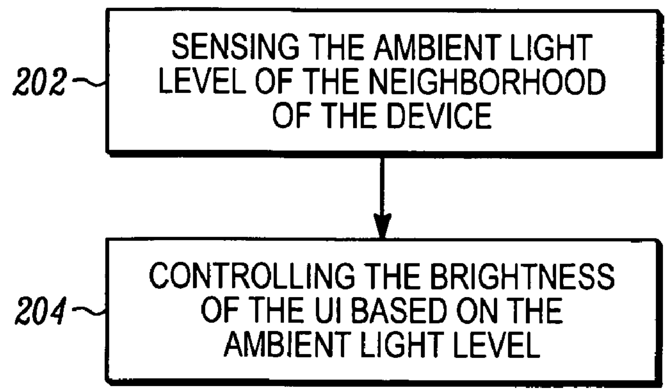
FIG. 2 is an exemplary flow diagram of illumination control.

FIG. 2 illustrates an exemplary method for illumination current control in a portable electronic device 100. The first step includes detecting or sensing 202 an ambient light level in a neighborhood of the portable electronic device 100 with a light sensor 104 that is carried on the electronic device 100. The next step includes controlling 204 the brightness of the user interface illumination based on the ambient light level detected, wherein the user interface illumination is operated at a brightness between a maximum brightness and a minimum brightness for at least one ambient light level detected.

Figure 3:
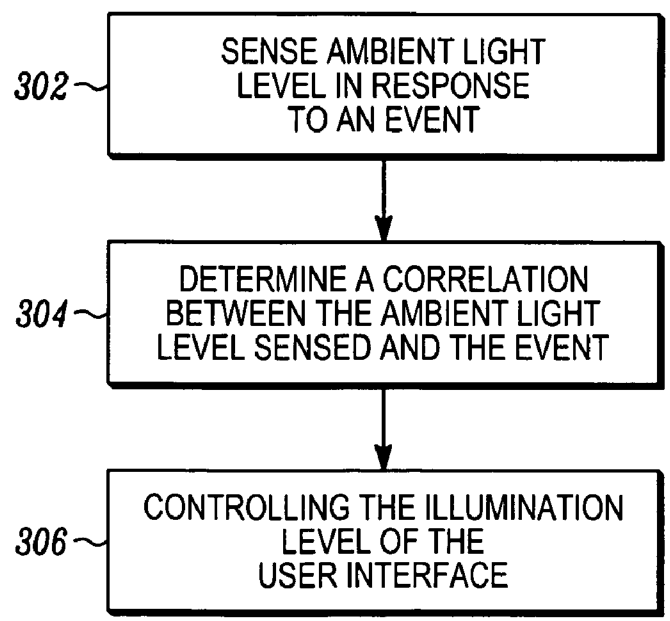
FIG. 3 is an exemplary flow diagram of illumination control.

FIG. 3 illustrates another exemplary method for illumination current control in a portable electronic device. The first step includes detecting or sensing 302 an ambient light level with a sensor 104 of the portable electronic device 100 in response to an event associated with the device 100. The next step includes determining 304 a correlation between the ambient light level sensed and the event. Then controlling 306 the brightness of the user interface illumination.

In this exemplary embodiment, the brightness is based on the determined correlation between the sensed ambient light level and the event. An event in the exemplary embodiment may be one of a plurality of events or may be a combination of events associated with the device 100. Some events may be user initiated. For example, one event may be the opening or closing of a cover of the device 100. When the cover is opened the light sensor 104 is activated thereby sensing the ambient light. Turning on the device 100 or depressing any of the keys on the keypad 116 or touching a touch screen display (which may be present in an alternative exemplary embodiment) are examples of other events. Other events may be the result of previously occurring events in the course of operation of the device 100 such as the reception of an incoming call or page, an internal clock or timer or the like. These software events trigger the sampling of the current ambient light level by the light sensor 104. The output of the light sensor 104 is representative of the ambient light level at the sensor 104 and a substantially the same time as the event.

Figure 4:
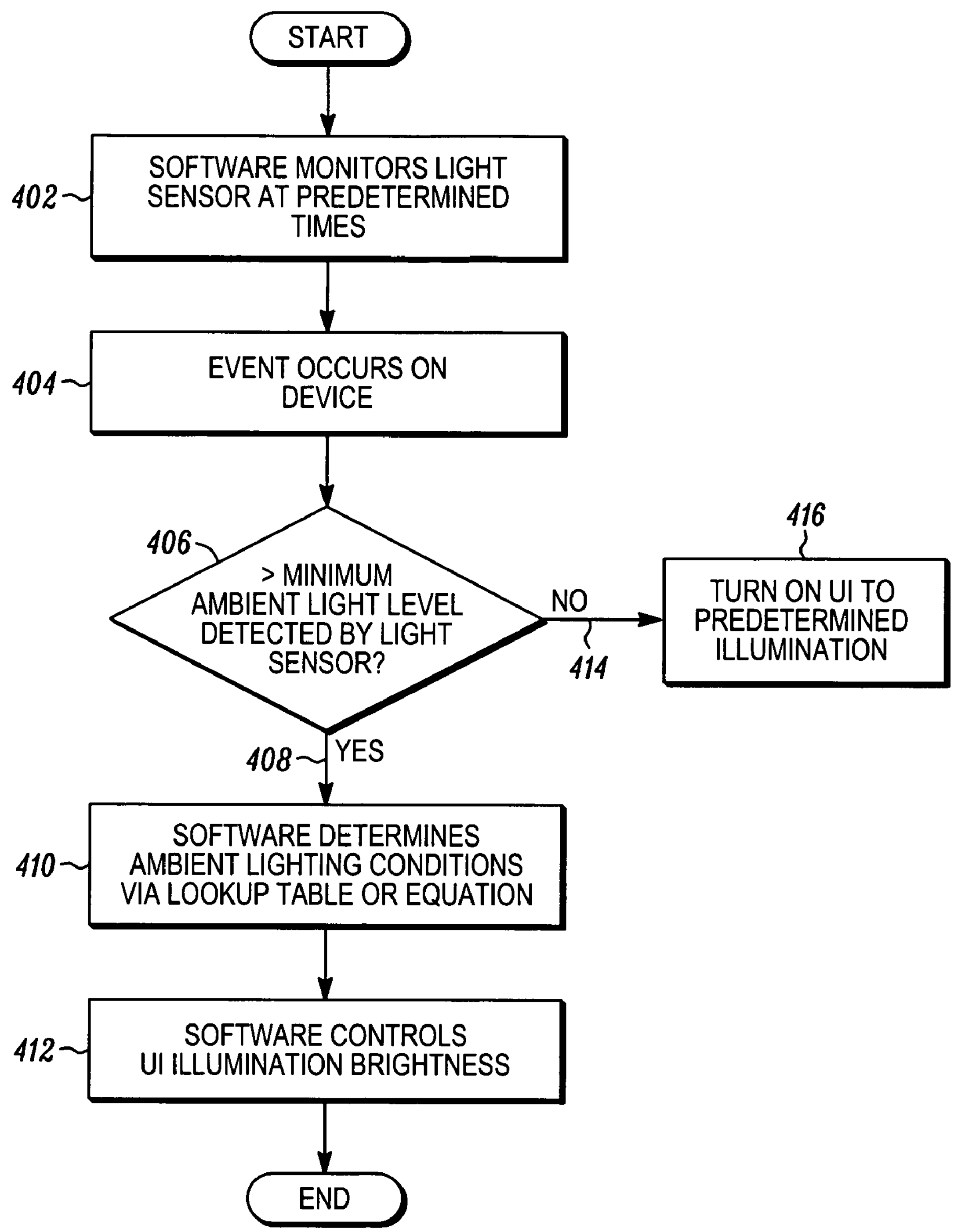
FIG. 4 is an exemplary flow diagram of illumination control.

In another exemplary embodiment illustrated in the flow chart shown in FIG. 4, the software monitors 402 the ambient light level, by the light sensor 104, at predetermined times. When an event occurs 404 the device determines 406 whether the minimum ambient light level has been detected by the light sensor 104. It is to be understood that the ambient light level may also be a predetermined ambient light level (threshold) and not necessarily a minimum ambient light level as in this exemplary embodiment. If the ambient light level has been met 408 the software determines 410 an illumination brightness via a lookup table or equation based on the ambient light level. The software controls 412 the user interface brightness by programming the determined current drain based on the lookup table or equation. If the ambient light level has not been met 414 the user interface illumination is turned on 416 with a predetermined brightness level. The predetermined brightness level may be one that produces optimal viewing brightness at low or zero ambient light levels.

Figure 5:
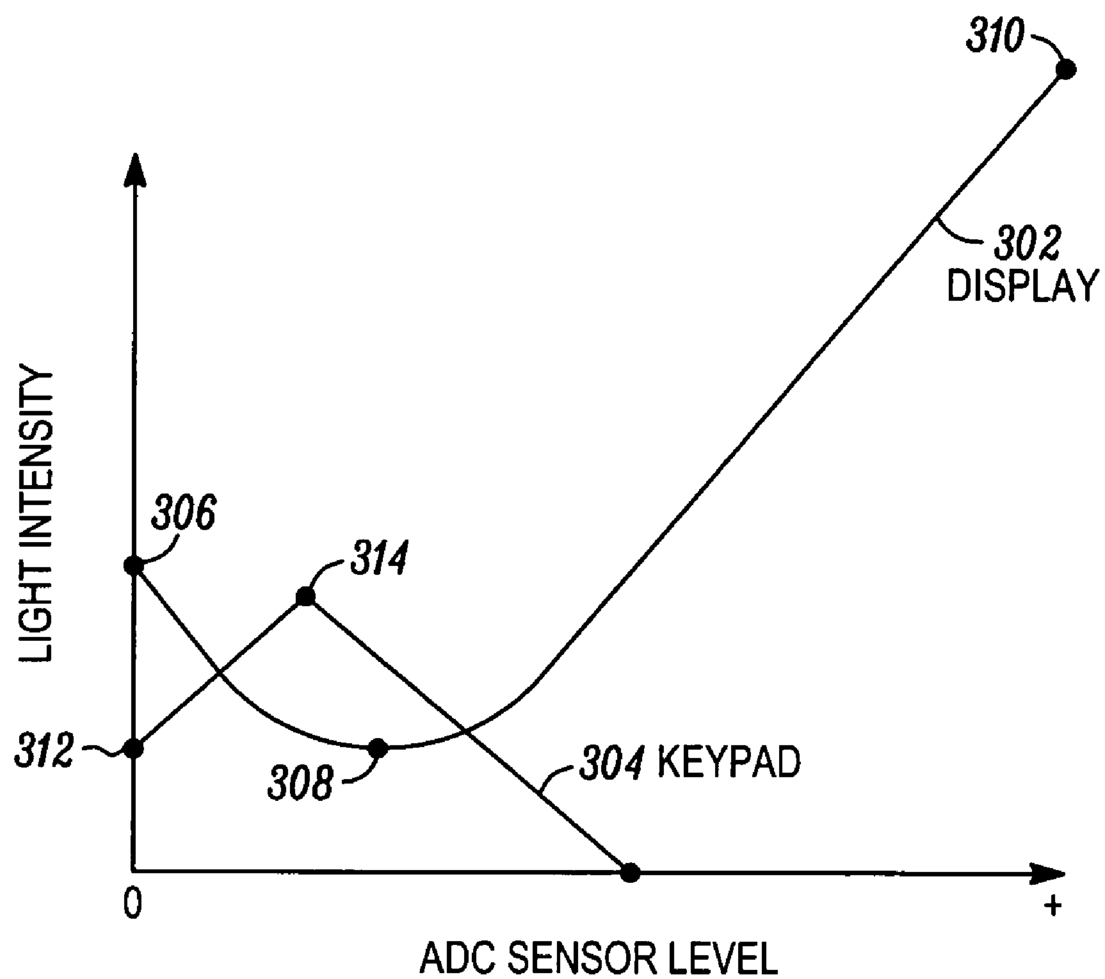
FIG. 5 is an exemplary illumination intensity chart.

FIG. 5 is an exemplary chart illustrating illumination intensity as a function of ADC 106 sensor level (i.e. light sensed by the light sensor converted into a digital signal). In this exemplary chart, both the keypad illumination and the display illumination are shown as a function of the light sensor 104 level as output from the ADC 106. Both the keypad illumination characteristics and the display illumination characteristics are illustrated in this exemplary embodiment, however it is understood that the user interface may be a keypad or a display, a combination thereof, or any other user interface that may use illumination to enhance or facilitate operation thereof.

The display illumination curve 302 shows that when the sensor level (x-axis) is substantially zero, the display illumination display is greater than zero. In this exemplary embodiment, the illumination of the display 118 is at a first display illumination 306 which is between minimum and maximum brightness. As the sensor level output (i.e. ambient light intensity) increases, the display illumination decreases to a second display illumination 308, which is a minimum illumination in this exemplary embodiment, and then begins to increase until a third display illumination 310, or maximum illumination, is reached. This display illumination curve may be employed to ensure that the display is readable in the various lighting conditions. For example, when there is zero ambient light, the display 118 will be illuminated but not fully as this is not necessary and therefore current drain may be reduced so as to improve battery life. As the ambient light increases the display needs less illumination until the ambient light becomes too bright, overcoming and washing out features on the display, and increasing the brightness of the display illumination becomes necessary to overcome the increased ambient light.

The keypad illumination curve 304 in this exemplary embodiment has a first keypad illumination 312, between zero and maximum illumination, when there is substantially zero ambient light. Again as with the display 118, less than maximum illumination is necessary when there is substantially zero ambient light thus conserving power by reducing the current drain on the battery. As the ambient light increases, the keypad illumination increase to a second keypad illumination 314 level, maximum brightness in this exemplary embodiment, when the ambient light is greater than zero. As the ambient light level increases further, less illumination of the keypad is necessary and the keypad illumination curve 304 decreases to a third keypad illumination 316, which in this exemplary embodiment is substantially zero. It is to be understood however that numerous curves and correlations to the light sensor level and thus ambient light level may be incorporated into the invention for both the display 118 and the keypad 116. The relationship between the ambient light level and the amount of illumination may depend on the type of user interface or the desired aesthetic look of the illumination.

In one exemplary embodiment wherein the user interface includes a keyboard 116 and a display 118 as in the device of FIG. 1, both the keypad illumination 114 and the display illumination 112 are simultaneously or substantially simultaneously controlled in response to the level of sensed ambient light. A display current drain is applied to the display illumination source 112 and a keypad current drain is applied to the keypad illumination source 114. A look up table or an equation is used to calculate the amount of illumination for each user interface based on the ADC 106 output which correlates to the current drain setting.

In one exemplary embodiment, multiple sensors are used to determine the ambient lighting conditions neighboring the device. For example, two light sensors may be carried on the device 100 in different locations. A first light sensor may be carried on the device 100 by the keypad 116. The first light sensor may be adjacent to the keypad 116 or near the keypad 116 for example. A second light sensor may be carried near the top of the device 100. The output of both light sensors may be sampled simultaneously or independently. In this embodiment the light sensors are simultaneously sampled or at least in a temporally contiguous fashion. The first light level output from the first light sensor and the second light level from the second light sensor may be used together or independently. In one example, the first light level and the second light level are monitored independently. The first light level may be used as a check against the second light level and vice versa. If, for example, the first light sensor is covered by a finger when the user is entering information on the keypad 116, the first light sensor will output an ambient light level that is not appropriate for the conditions. The first light level may compared to the second light level and if the difference between the two light levels meets a predetermined delta the first light level is ignored. This allows the device to determine the true ambient light level and not turn on the illumination when it is not really necessary due to the erroneous measurement.

In another exemplary embodiment the first light sensor and the second light sensor are carried at different positions and are configured to sense light from different orientations relative to the device 100. In this exemplary embodiment, the orientation of the user interface relative to the ambient light or the ambient light source is sensed and the user interface illumination is controlled accordingly. For example, if the display 118 is subject to glare from the ambient light, display current drain is increased to the display illumination source 112 thereby increasing the brightness of the display.

Figure 6:
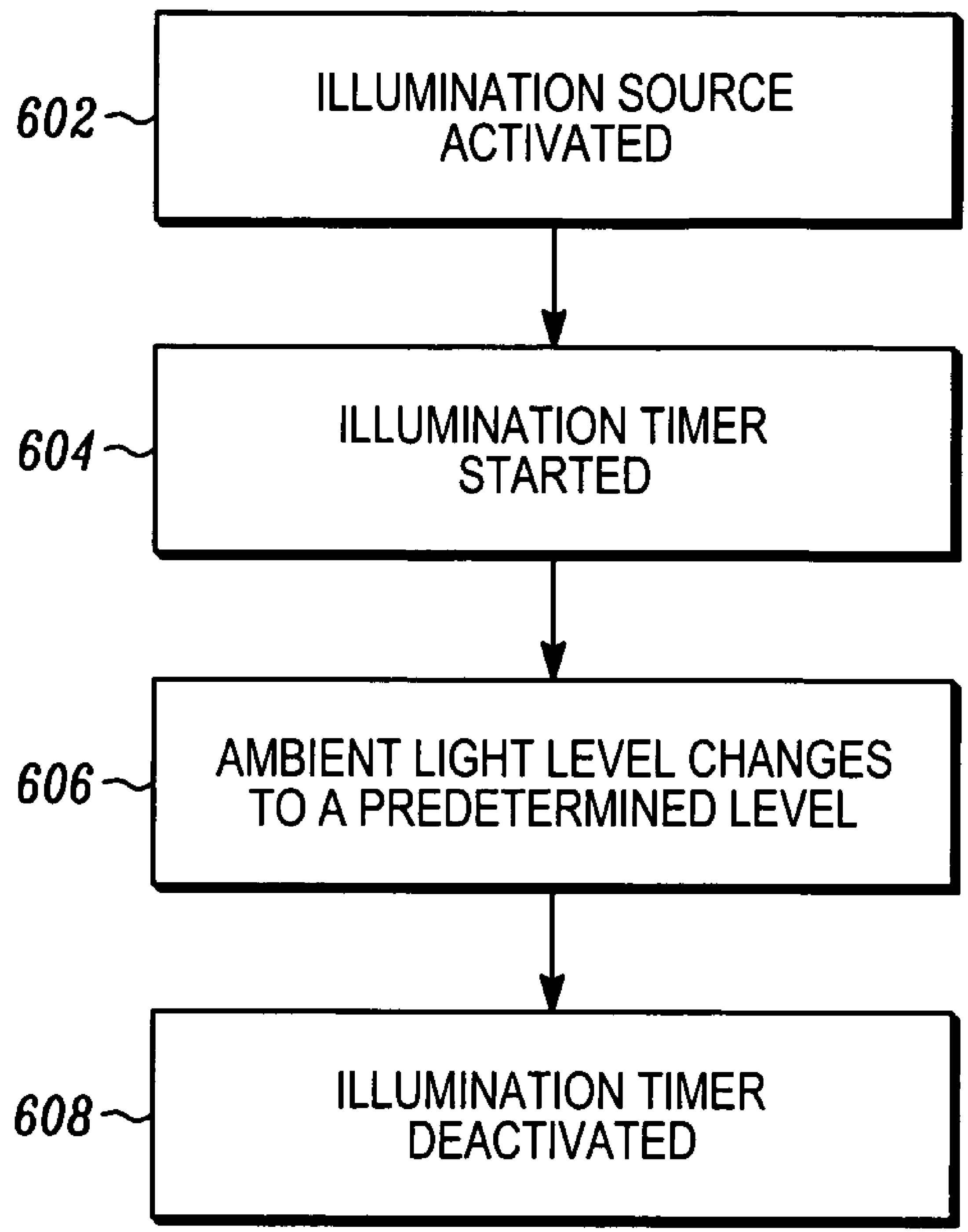
FIG. 6 is an exemplary flow diagram of illumination control.

FIG. 6 illustrates an exemplary flow diagram wherein a timer is implemented in the illumination control process. In this exemplary embodiment a timer is activated when the illumination is activated. The timer may be activated based on the same event that activates the illumination or upon the activation of the illumination source 110 itself or on another event associated with the device for example. In this exemplary embodiment, the illumination source 110 is activated 602 and the timer is activated 604. While the timer is still activated the ambient light changes 606 to a first predetermined level which is sensed by the light sensor 104. In this exemplary embodiment, when the first predetermined level is reached the timer is deactivated 608 and the illumination source 110 remains active until a further event occurs deactivating the illumination source 110.

This exemplary method allows the device 100 to respond quickly to ambient light changes, such that the illumination source 110 maybe adjusted or turned on or off before the timer expires. For example if the keypad illumination source timer setting is set to 20 seconds and the flip or cover of the device 100 is opened (i.e. the triggering even) or key is depressed just after entering a dark room from a brightly lit environment, the keypad illumination source 110 will be set to on and the timer deactivated.

The ambient light level may be determined by a single measurement, multiple measurements or measurements taken at a regular predetermined frequency. For example, an event may trigger a single ambient light level measurement to be taken such as when the device is turned on, a key is pressed, the cover is opened on the device 100 or the like.

In one exemplary embodiment the ambient light level is sampled at different predetermined frequencies depending on different events that occur. For example, on a device that has a flip or cover, while the flip is closed the ambient light level is sampled less frequently then when the flip is open. In this exemplary embodiment, when an event occurs the ‘hook-switch’ detect indicates that the flip is opened, the first few samples will be taken at a greater frequency to correctly detect if enough ambient light is available. Otherwise the running average of all 5 previous samples may result in a ‘no lighting’ condition with the flip closed and provide an undesirable delay in recognizing the change in ambient lighting.

In one exemplary embodiment, the contrast level of the display is controlled as a function of the neighboring ambient light. As the ambient light level changes the contrast of the display is changed. In one exemplary embodiment, the contrast is increased as the amount of ambient light increases and as the ambient light decreases, the contrast deceases. In another exemplary embodiment, the contrast and the brightness of the display may be changed to achieve the best illumination with the least amount of current drain. In this exemplary embodiment, the method for improving current drain comprises measuring the ambient light level with a light, and from the ambient light level, determining a correlation between the ambient light level. Then, controlling a visual characteristic of the user interface in response to the determined correlation. In one exemplary embodiment, the method comprises controlling at least one of a contrast level and a brightness level of the user interface in response to the determined correlation.

While the present disclosure and what are presently considered to be the best modes thereof have been described in a manner establishing possession by the inventors and enabling those of ordinary skill in the art to make and use the same, it will be understood and appreciated that there are many equivalents to the exemplary embodiments disclosed herein and that modifications and variations may be made thereto without departing from the scope and spirit of the inventions, which are to be limited not by the exemplary embodiments but by the appended claims.

What is claimed is:

1. A portable electronic device comprising:

a controller;

an event trigger other than one caused by a light sensor;

a user interface backlight coupled to the controller;

a light sensor coupled to the controller; and a current source coupled to the controller, the controller being configured to: activate the user interface backlight illumination based upon the event trigger; and to control current to the user interface backlight based on the ambient light detected by the light sensor.

2. The portable electronic device of claim 1, wherein the user interface backlight is one of a keypad backlight and a display backlight.

3. The portable electronic device of claim 1, wherein a second light sensor located at a position on the device other than the position of the first light sensor, the second light sensor coupled to the controller.

4. The portable electronic device of claim 3, wherein the controller further comprises a comparison means to compare a first light sensor measurement with a second light sensor measurement, wherein if a difference between the two meets a predetermined delta, the first light sensor measurement is disregarded; thus, this allows the device to determine the true ambient light level and not turn on the illumination when it is not really necessary due to the erroneous measurement.

5. The portable electronic device of claim 1, wherein the event trigger includes at least one of: a software event trigger; opening or closing of a cover of the portable device; powering up the portable device; user initiated; receipt of a call or page; and timer initiated.

6. The portable electronic device of claim 1, wherein the controller is configured to illuminate a first user interface and a second user interface.

7. The portable electronic device of claim 1, wherein the controller is configured to control a contrast level of the user interface.

8. The portable electronic device of claim 1, wherein the controller is configured to deactivate the illumination of the user interface backlight after a predetermined time.

9. The portable electronic device of claim 1, wherein the controller is configured to activate an illumination source to illuminate the user interface prior to measuring the ambient light level.

10. The portable electronic device of claim 1, wherein the controller is configured to activate an illumination source to illuminate the user interface for a predetermined time.

* * * * *